(12) United States Patent
Kryger et al.

(10) Patent No.: US 6,446,102 B1
(45) Date of Patent: Sep. 3, 2002

(54) METHOD AND DEVICE FOR HIGH SPEED SCALE CONVERSION

(75) Inventors: David L. Kryger, Chelmsford, MA (US); Steven Webster, Raymond, NH (US)

(73) Assignee: Schneider Automation, Inc., North Andover, MA (US)

( * ) Notice: Subject to any disclaimer, the term of this patent is extended or adjusted under 35 U.S.C. 154(b) by 0 days.

(21) Appl. No.: 09/316,892

(22) Filed: May 21, 1999

(51) Int. Cl.[7] .................................................. G06F 5/01
(52) U.S. Cl. ........................................ 708/208; 341/96
(58) Field of Search ................................ 708/208, 203, 708/200; 341/96

(56) References Cited

U.S. PATENT DOCUMENTS 4,727,506 A * 2/1988 Fling .......................... 708/208
5,282,152 A * 1/1994 Caviasca et al. ............. 708/200

* cited by examiner

*Primary Examiner*—David H. Malzahn
(74) *Attorney, Agent, or Firm*—Michael J. Femal; Larry I. Golden

(57) ABSTRACT

A method and a device for high-speed scale conversion wherein a value N within a range of N1 and N2 is converted into a small value M within a range of M1 and M2. The method includes the step of obtaining an approximate value of M by loading the value $(N-N1+2^{p-1})$ into a multi-bit shift register and right-shifting p bits. A binary search process is then used to determine the error value between the actual value of M and the approximate value of M. By avoiding actual multiplication processes, the conversion can be carried out using low-cost electronic hardware such as a microprocessor or a PROM to carry out the binary search process, a shift-register to obtain the approximate value of M, a multiplexer to receive an analog input data N and an A/D converter to convert the analog input data N into a digital data N.

14 Claims, 1 Drawing Sheet

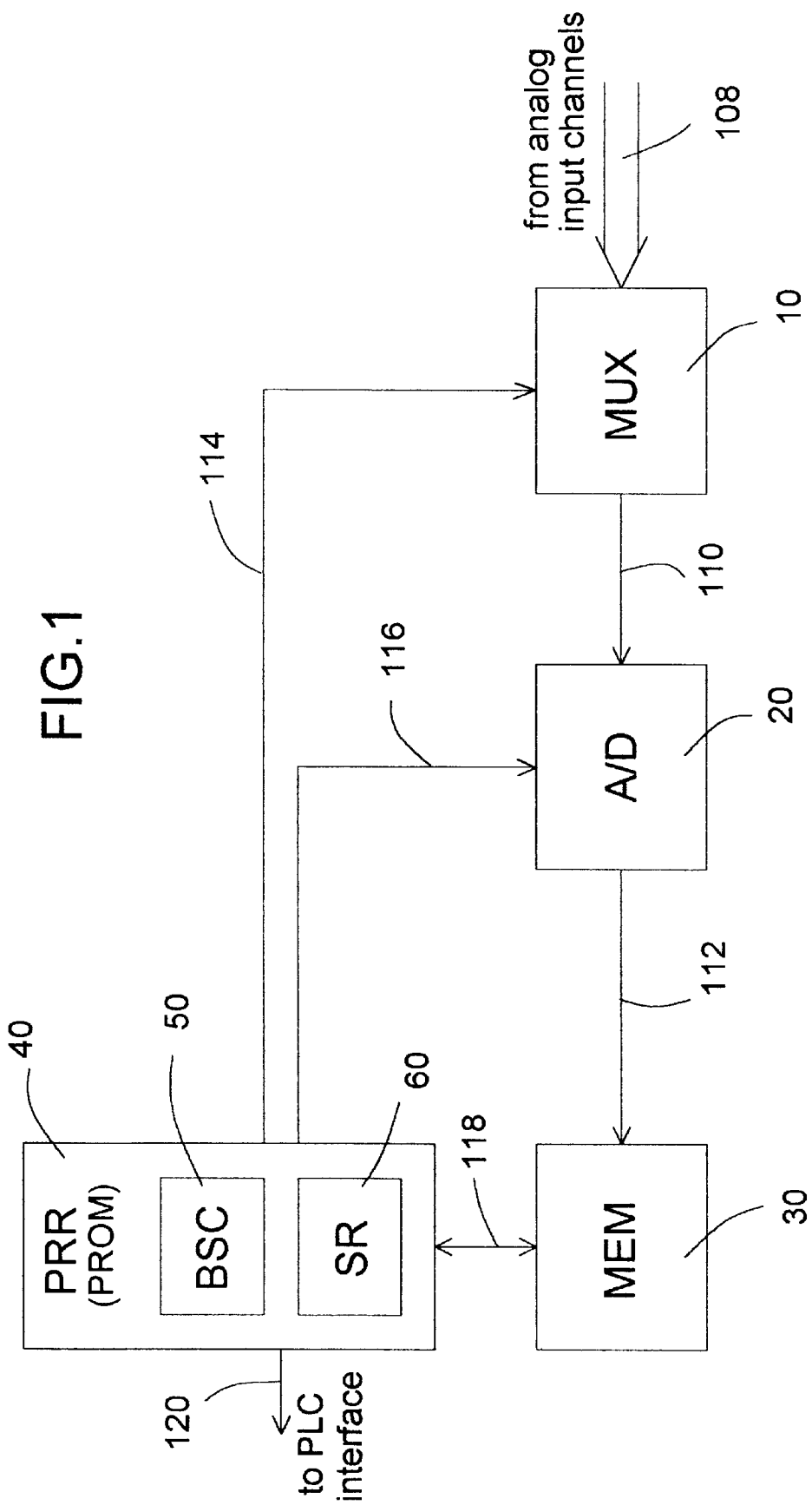

METHOD AND DEVICE FOR HIGH SPEED SCALE CONVERSION

FIELD OF THE INVENTION

The present invention relates to a method and device for performing high speed scale conversion from one numerical value to another, smaller numerical value.

BACKGROUND OF THE INVENTION

In automation and other numerical control applications, it is usually required to convert an input value to an output value. This scaling process is required to be carried out in a very short time, without the support of a fast computation means such as a computer. For example, the one scaling scheme of interest is to convert input values in the range of 8000 to 40000 into output values in the range of 0 to 4095. It is preferred that the entire conversion process is achieved within 0.1 millisecond. At the same time, the cost to manufacture the conversion module is required to be low. The cost constraint requires that the hardware is limited to the use of a single A/D converter, and no numeral hardware support to do the scale conversion.

It is, therefore, desirable to provide a low cost method and device for high speed scale conversion wherein the errors are at sufficiently low levels.

SUMMARY OF THE INVENTION

It is an objective of the present invention to provide a method and a device to perform high speed scale conversion without using costly electronic components. This objective can be achieved by performing an approximate division of the input digital data, followed by providing a correction to the approximate result. In particular, the approximate division is carried out by right-shifting of the contents in a multi-bit shift-register, and the correction is made by a binary search process.

The method of high speed scale conversion, according to the present invention, converts an input data having a value N in the range of N1 to N2 to an output data having a value M in the range of M1 to M2, where M, N, M1, M2, N1 and N2 are positive integers, and includes the steps of:

1) determining a positive integer p such that $$|q-2^p|<|q-2^{p-1}|$$

and $$|q-2^{p-1}| \leq |q-2^{p+1}|,$$

where $q=(N2-N1)/(M2-M1)$;

2) loading the value $V(N)=(N-N1+2^{p-1})$ onto a multi-bit shift register and right-shifting the contents of the shift register (toward the least-significant bit) by p bits to obtain a reduced value $A(N)$;

3) obtaining an error value $E(N)$ from a binary search process; and 4) obtaining the value M from $$M=A(N)+M1+E(N).$$

wherein the binary search process includes the steps of:

I) obtaining an integer D such that $$D=R\{(N2-N1)*|(1/q-1/2^p)|\}$$

where $R\{x\}$ is the rounded off value of x (e.g. $R\{2.57\}=3$ and $R\{2.49\}=2$);

II) establishing a list of correction values $C(n)$ for $n=0$ to $n=D$, such that $$C(n)=R\{(2n-1)*Q\}$$

where $$Q=(N2-N1)/2D;$$

and

III) assigning $E(N)=m$, where $$C(m) \leq (N-N1) < C(m+1)$$

It should be noted that, for simplicity, it is possible to use the value $V(N)=(N-N1)$, instead of $V(N)=(N-N1+2^{p-1})$, in Step 2.

The above-described method will be easier to appreciate with the following explanation.

When a value N within a range of N1 to N2 is required to be converted to a value M within a smaller range of M1 to M2, the usual way would be to calculate M according to the following equation:

$$M=R\{(N-N1)*(1/q)\}+M1$$

or $$M-M1=R\{(N-N1)*(1/q)\}$$

The usual way of converting N to M involves actual multiplication of two numbers, namely $(N-N1)$ and $1/q$, which requires supporting hardware and/or a lengthy computation time. Alternatively, the value of $(M-M1)$ can be crudely approximated from $(N-N1)/2^P$ and an error value is added to or subtracted from the approximate value to correct for the discrepancies. The approximate value can be obtained by loading the value of $(N-N1)$ onto a multi-bit shift-register and right-shifting the contents of the shift register by p bits. This approximation leads to an error approximately equal to:

$$E(N)=(N-N1)*|(1/q-1/2^p)|$$

In the digital process, $E(N)$ is approximately equal to $$E(N)=R\{(N-N1)*|(1/q-1/2^p)|\}$$

It should be noted that when N=N1, there is no error and therefore $E(N1)=0$. When N=N2, the error is largest and approximately equal to:

$$E(N2)=R\{(N2-N1)*|(1/q-1/2^p)|\}=D$$

For the purpose of estimating the error value $E(N)$ for any value N without actual multiplication, a binary search process can be used to obtain an approximate value of $E(N)$. To facilitate the binary search process, the input data range $(N2-N1)$ is partitioned into D approximately equal sections. Each of the D sections is denoted by an index number n, from $n=0$ to $n=D$, such that each section n is bounded by $C(n)$ and $C(n+1)$, where $C(n)$ is approximately equal to $(n/D)(N2-N1)$. However, in order to minimize the errors resulting from rounding off decimal numbers, it is preferred that the range is partitioned into D+1 sections and $C(n)$ is computed according to $$C(n)=R\{(2n-1)*Q\}$$

where $$Q=(N2-N1)/2D$$

The goal of a binary search is to locate the section that contains the value (N–N2). In other words, the search is to locate the mth section where $$C(m) \leq (N-N1) < C(m+1)$$

and to assign the error value for N such that E(N)=m.

Furthermore, in order to reduce the discrepancies between this approximation method and the actual multiplication, it is desirable to load the value of $(N-N1+2^{p-1})$, instead of (N–N1), onto the shift-register. This is due to the fact that, after right-shifting, the value behind the decimal point will be lost regardless of its magnitude. For example, if the value N–N1=15 is loaded into the shift register and right-shifted 3 bits, the result is 1 even though 15/8=1.875. It is different from the rounded off value of 1.875 which is 2. Therefore, it is preferable to load the value (N–N1+4) into the shift register instead of N–N1.

With all the values of C(n) being pre-calculated and electronically stored, the binary search process starts at level 1 to compare the value Z(=N–N1) with C(K) where K is the middle index number between 0 and D+1 to determine which half (approximately) of the input data range (N2–N1) contains the value Z. After knowing which half of the range (N2–N1) contains the value Z, the next search will be carried out only in that half of the range. Thus, in level 2, the search range is reduced to approximately half, and the goal is to determine which quarter (approximately) of the range (N2–N1) contains the value Z. Thus, at the next level, the search range is further reduced to approximately one quarter of the range. The search continues in a similar fashion until the section in which the value Z falls is finally identified.

The major advantages of binary search are that it usually requires only a small number of search steps to obtain the error value E(N) for a given N, and that the search process can be implemented on relatively inexpensive electronic components such as microprocessors. If D is less than or equal to $(2_k-1)$, the binary search will take at most k steps to complete.

With the method of scale conversion, according to the present invention, the total conversion time is the sum of (1) the time required for subtracting N1 (or preferably $N1-2^{p-1}$) from N, (2) the time required for loading the value (N–N1), or preferably $(N-N1+2^{p-1})$, into the shift register and right-shifting the register, (3) the total number of steps in the binary search, which is equal to or less than k when D is less than or equal to $(2_k-1)$, and (4) the time required for adding the error value and M1 to the right-shifted value.

The scale conversion method will be demonstrated herein using the following example, with N=8783, N2=40000, N1=8000, M2=4095 and M1=0.

1) q=32000/4095=7.8144078 or 1/q=0.1279687
   p=3

I) $(1/q-1/2^p)=0.0029687$
   D=R{32000*0.0029687}=R{95.00}=95

II) Q=32000/190=168.42105
   C(n)=R{(2n-1)*168.42105}, where n=0 to n=95.
   C(0)=0
   C(1)=R{1*168.42105}=168
   C(2)=R{3*168.42105}=R{505.26316}=505
   C(3)=R{5*168.42105}=R{842.10526}=842

C(14)=R{27*168.42105}=R{4547.36}=4547
   C(15)=R{29*168.42105}=R{4884.21}=4884

C(16)=R{31*168.42105}=R{5221.05}=5221
   C(17)=R{33*168.42105}=R{5557.89}=5558

C(91)=R{181*168.42105}=R{30484.21}=30484
   C(92)=R{183*168.42105}=R{30821.05}=30821
   C(93)=R{185*168.42105}=R{31157.89}=31158
   C(94)=R{187*168.42105}=R{31494.74}=31495
   C(95)=R{189*168.42105}=R{31831.58}=31842

2) V(N)=8783–4000+4=787

On shift-register:

787 = 1 1 0 0 0 1 0 0 1 1 right shifted (3) = 0 0 0 1 1 0 0 0 1 1 = 98

A(N) = 98

3) Since C(2)=505 and C(3)=842, we have C(2)≤783 <C(3). Accordingly, E(8783)=2
4) M=98+0+2=100

The value of M obtained from Steps (1) through (4) above can be compared with the value obtained from actual multiplication:

$$M=R\{(4095/32000)(8783-8000)\}+0=R\{100.199\}=100$$

If N=38781, V(N)=38781–4000+4=30785
2) On shift-register:

30785 = 1 1 1 1 0 0 0 0 1 0 0 0 0 0 1 right shifted (3) = 0 0 0 1 1 1 1 0 0 0 0 1 0 0 0 = 3848

A(N) = 3848

3) Since C(91)=30484 and C(92)=30821, we have C(91) ≤30781<C(92). Accordingly, E(30781)=91.
4) M=3848+0+91=3939
Actual multiplication:

$$M=R\{(4095/32000)(38781-8000)\}+0=R\{3939.006\}=3939$$

The above two examples used to demonstrate the method of high-speed scale conversion yield a perfect match with the actual computation. It should be noted that, however, not all values N within the range of N1 and N2 will give an exactly correct value M.

The preferred version of the method of high speed scale conversion, according to the present invention, uses a microprocessor with adequate memory to store all the C(n) values and to carry out the binary search process using a search function BSX, regarding an input value N and the error value E(N). The search function BSX, for example, can be represented by:

$$BSX=BS(U,V,W),$$

and is defined as follows:
   1) the search is based on the reference value C(X); and
   2) if Z=C(X), go to U; if Z<C(X), go to V; and if Z>C(X), go to W. Here Z=N–N1.

Furthermore, another function EX is also used in the search process, which is defined as to assign E(N)=X. For example, for X=54, BSX means that the search is based on the reference value C(X)=9095 and the search function is BS54=BS(E54, BS51, BS57). If Z is equal to 9095, then E(N)=54. If Z is smaller than 9095, the search will be carried out at the next level, with BS51=BS(E51, BS50, BS52) and based on the reference value C(51). If Z is greater than 9095, then the search will be carried out at the next level, with BS57=BS(E57, BS56, BS58) and based on the reference value C(57).

In the case of D=95, the search starts at level 1 with X=48:

```
-Level 1  BS48 = BS(E48, BS24, BS72)
-Level 2  BS24 = BS(E24, BS12, BS36)
          BS72 = BS(E72, BS60, B584)
-Level 3  BS12 = BS(E12, BS6, BS18)
          BS36 = BS(E36, BS30, BS42)
          BS60 = BS(E60, BS54, BS66)
          BS84 = BS(E84, BS78, BS90)
-Level 4  BS6 = BS(E6, BS3, BS9)
          BS18 = BS(E18, BS15, BS21)
          BS30 = BS(E30, BS27, BS33)
          BS42 = BS(E42, BS39, BS45)
          BS54 = BS(E54, BS51, BS57)
          BS66 = BS(E66, BS63, BS69)
          BS78 = BS(E78, BS75, BS81)
          BS90 = BS(E90, BS87, BS93)
-Level 5  BS3 = BS(E3, BS2, BS4)
          BS9 = BS(E9, BS8, BS10)
          BS15 = BS(E15, BS14, BS16)
          BS21 = BS(E21, BS20, BS22)
          BS27 = BS(E27, BS26, BS28)
          BS33 = BS(E33, BS32, BS42)
          BS39 = BS(E39, BS38, BS40)
          BS45 = BS(E45, BS44, BS46)
          BS51 = BS(E51, BS50, BS52)
          BS57 = BS(E57, BS56, BS58)
          BS63 = BS(E63, BS62, BS64)
          BS69 = BS(E69, BS68, BS70)
          BS75 = BS(E75, BS74, BS76)
          BS81 = BS(E81, BS80, BS82)
          BS87 = BS(E87, BS86, BS88)
          BS93 = BS(E93, BS92, BS94)
-Level 6  BS2 = BS(E2, BS1, E2)
          BS4 = BS(E4, E3, BS5)
          BS8 = BS(E8, BS7, E8)
          BS10 = BS(E10, E9, BS11)
          BS14 = BS(E14, BS13, E14)
          BS16 = BS(E16, E15, BS17)
          BS20 = BS(E20, BS19, E20)
          BS22 = BS(E22, E21, BS23)
          BS26 = BS(E26, BS25, E26)
          BS28 = BS(E28, E27, BS29)
          BS32 = BS(E32, BS31, E32)
          BS34 = BS(E34, E33, BS35)
          BS38 = BS(E38, BS37, E38)
          BS40 = BS(E40, E39, BS41)
          BS44 = BS(E44, BS43, E44)
          BS46 = BS(E46, E45, BS47)
          BS50 = BS(E50, BS49, E50)
          BS52 = BS(E52, E51, BS53)
          BS56 = BS(E56, BS55, E56)
          BS58 = BS(E58, E57, BS59)
          BS62 = BS(E62, BS61, E62)
          BS64 = BS(E64, E63, BS65)
          BS68 = BS(E68, BS67, E68)
          BS70 = BS(E70, E69, BS71)
          BS74 = BS(E74, BS73, E74)
          BS76 = BS(E76, E75, BS77)
          BS80 = BS(E80, BS79, E80)
          BS82 = BS(E82, E81, BS83)
          BS86 = BS(E86, BS85, E86)
          BS88 = BS(E88, E87, BS89)
          BS92 = BS(E92, BS91, E92)
          BS94 = BS(E94, E93, BS95)
-Level 7  BSK = BS(EK, EL, EK) where L = K-1
          For K = 1,5,7,11,13,17,19,23,25,29,31,35,37,41,43,47,49,53,
          55,59,61,65,67,71,73,77,79,83,85,89,91,95
```

The following is a binary search example with N=10783, or Z=(N−N1)=6783.

At Level 1, C(48)=R{95*168.42105)}=16000 and BS48= BS(E48, BS24, BS72). Because Z<C(48), or the value (N−N1) falls in the range of 0 to 16000, the search at level 2 will be carried out according to BS24.

At Level 2, C(24)=R{47*168.42105}=7916 and BS24= BS(E24, B12, B36). Because Z<C(24), or the value (N−N1) falls in the range of 0 to 7916, the search at level 3 will be carried out according to BS12.

At Level 3, C(12)=R{23*168.42105)=3874 and BS12= BS(E12, BS6, BS18). Because Z>C(12), or the value (N−N1) falls in the range of 3874 to 7916, the search at level 4 will be carried out according to BS18.

At Level 4, C(18)=R{35*168.42105)=5895 and BS18= BS(E18, BS15, BS21). Because Z>C(18), or the value of (N−N1) falls in the range of 5895 to 7916, the search at level 5 will be carried out according to BS21.

At Level 5, C(21)=R{41*168.42105}=6905 and BS21= BS(E21, BS20, BS22). Because Z<C(21), or the value of (N−N1) falls in the range of 5895 to 6905, the search at level 6 is carried out according to BS20.

At Level 6, C(20)=R{39*168.42105}=6568 and BS20= BS(ES20, BS19, E20). Because Z>C(20), or the value of (N−N1) falls in the range of 6565 and 6905, the search at level 7 is not necessary because the next step is E20, or assigning E(6785)=20.

The method of scale conversion, according to the present inventin, has the advantage of being able to be carried out on a low cost device as shown in FIG. 1.

BRIEF DESCRIPTION OF THE INVENTION

FIG. 1 illustrates the preferred embodiment of the electronic hardware that can be used for high-speed scale conversion.

Detailed Description of the Preferred Embodiment

FIG. 1 illustrates the preferred embodiment of the electronic hardware that can be used for carrying out the required high-speed scale conversion. In FIG. 1, there is shown a multiplexer (MUX, 10) having a data input terminal to receive input data 108 from a plurality of analog input channels. The input data is then provided to an A/D converter 20 which converts the input analog data 110 into digital data 112. The digital data 112 is transfer to a storage device 30 to be further processed by a processing means (PRR, 40). The processing means may comprise a PROM for programming, and a shift register (SR, 60) to carry out the approximate division. A program BSR 50 can be programmed in the processing means 40 to carry out the binary research and other control functions. As shown in FIG. 1, the processing means sends out command 114 to the multiplexer 10 for receiving input data 108 and to provide data 110 to the A/D converter 20. In order to receive analog input data in the range of 0 to 40000 from 16 analog input channels, the multiplexer 10 can be a 16-to-1 multiplexer. The data storage means 30 can be a RAM. The result of the scale conversion from the processing means 40 can be provided to a digital device such as a PLC.

The method of scale conversion, according to the present invention, can be implemented by properly programming the processing means 40. For example, since M1, M2, N1 and N2 are given in a particular application, the positive integer p, in Step 1, can be pre-calculated and then programmed into the processing means 40. Moreover, the values for q, D and C(n) where n=0 to n=D+1 can be computed with any computation means such as a calculator. With q, D and C(n) being known, the binary search function BSX is then programmed into the program module BSR 50.

The hardware as depicted in FIG. 1 is the preferred embodiment of the present invention. It should be noted that, the method of high-speed scale conversion, according to the present invention, can be implemented in other hardware embodiments as well. Therefore, although the invention has been described with respect to a preferred version and embodiment thereof, it will be understood by those skilled in the art that the foregoing and various other changes, omissions and deviations in the form and detail thereof may be made without depart from the spirit and scope of this invention.

What is claimed is:

1. In a digital control application where a device is being controlled by a first signal having a value M within a first range defined by a lower limit M1 and an upper limit M2, a method for obtaining the first signal from a second signal having a value N within a second range defined by a lower limit N1 and an upper limit N2, wherein the second range is greater than the first range, said method comprising the steps of:

1) determining a positive integer p such that $$|q-2^p|<|q-2^{p-1}|$$

and $$|q-2^p|\leq|q-2^{p+1}|,$$

wherein q=(N2−N1)/(M2−M1);
   2) dividing a value V(N)=(N−N1+$2^{p-1}$) by $2^p$ to obtain a reduced value A(N);
   3) obtaining an error value E(N) from a binary search process;
   4) obtaining the value M from $$M=A(N)+M1+E(N),\text{ and}$$

5) using the value M as the first signal.

2. The method of claim 1, wherein the binary search process comprises the steps of:
   I) obtaining an integer D such that $$D=R\{(N2-N1)*|(1/q-1/2^{p-1})|\}$$

wherein R{x} is a rounded off value of x;
   II) establishing a list of correction values C(n) for n=0 to n=D such that $$C(n)=R\{(2n-1)*Q\}$$

wherein Q=(N2−N1)/2D;
   III) assigning E(N)=m wherein m is an integer such that $$C(m)\leq(N-N1)<C(m+1).$$

3. The method of claim 1, wherein the binary search process comprises the steps of:
   I) obtaining an integer D such that $$D=R\{(N2-N1)*|(1/q-1/2^{p-1})|\}$$

wherein R{x} is a rounded off value of x;
   II) partitioning the second range into D sections, each section denoted by an index number n with n=0 to n=D such that each section is bounded by C(n) and C(n+1), wherein C(n) is approximately equal to (n/D)(N2−N1);
   III) determining an integer m such that $$C(m)\leq(N-N1)<C(m+1);$$

IV) obtaining the error value E(N) by equating m thereto.

4. The method of claim 1, wherein the binary search process comprises the steps of:
   I) obtaining an integer D such that $$D=R\{(N2-N1)*|(1/q-1/2^{p-1})|\}$$

wherein R{x} is a rounded off value of x;
   II) partitioning the second range into D+1 sections, each section denoted by an index number n with n=0 to n=D such that each section is bounded by C(n) and C(n+1) wherein $$C(n)=R\{(2n-1)*Q\},$$

wherein Q=(N2−N1)/2D;
   III) determining an integer m such that $$C(m)\leq(N-N1)<C(m+1);$$

IV) obtaining the error value E(N) by equating m thereto.

5. The method of claim 1 wherein the division of Step 2 is achieved by loading the value V(N)=(N−N1+$2^{p-1}$) into a multi-bit shift register and right-shifting the contents of the shift register by p bits to obtain the reduced value A(N).

6. A method of scale conversion to obtain a first value M within a first range defined by a lower limit M1 and an upper limit M2 from a second value N within a second range defined by a lower limit N1 and an upper limit N2, wherein the second range is greater than the first range, wherein a multi-bit shift register is used to carry out approximating division, said method comprising the steps of:

1) determining a positive integer p such that $$|q-2^p|<|q-2^{p-1}|$$

and $$|q-2^p|\leq|q-2^{p+1}|,$$

wherein q=(N2−N1)/(M2−M1);
   2) obtaining an integer D such that $$D=R\{(N2-N1)*|(1/q-1/2^{p-1})|\}$$

wherein R{x} is a rounded off value of x;
   3) storing a series of correction values C(n) for n=0 to n=D such that $$C(n)=R\{(2n-1)*Q\}$$

wherein Q=(N2−N1)/2D;
   4) dividing a value V(N)=(N−N1+$2^{p-1}$) by $2^p$ to obtain a reduced value A(N);
   5) using a binary search process to compare (N−N1) to the stored values of C(n) in order to obtain an integer m such that $$C(m)\leq(N-N1)<C(m+1)$$

6) assigning an error value E(N) to be equal to m obtained in step 5; and
   7) obtaining the value M from $$M=A(N)+M1+E(N).$$

7. The method of claim 6 wherein the division in Step 4 is achieved by loading the value $V(N)=(N-N1+2^{p-1})$ into a multi-bit shift register and right-shifting the contents of said shift register by p bits to obtain the reduced value A(N).

8. A device for converting a first digital signal indicative of a value N within a first range defined by a lower limit N1 and an upper limit N2 into a second digital signal indicative of a value M within a second range defined by a lower limit M1 and an upper limit M2, comprising:

means (30) for storing the first signal;

means (40), responsive to the first signal, for obtaining a positive integer p from the first range and the second range, wherein the integer p is defined by $$|q-2^p|<|q\ 2^{p-1}|$$

and $$|q-2^p|\leq|q-2^{p+1}|,$$

and $$q=(N2-N1)/(M2-M2);$$

means (50), responsive to the integer p, for obtaining an error value E(N) in a binary search process; and means (60), responsive to the integer p and the error value E(N), for obtaining a reduced value A(N) for providing the second signal.

9. The device of claim 8 wherein said storing means (30) is a RAM.

10. The device of claim 8 wherein said error value obtaining means (50) comprises a PROM.

11. The device of claim 8 wherein said error value obtaining means (50) comprises a microprocessor.

12. The device of claim 8, wherein said error value obtaining means (50) is programmed to carry out the follow steps:

1) obtaining an integer D such that $$D=R\{(N2-N1)*|(1/q-1/2^{p-1})|\},$$

wherein R{x} is a rounded off value of x;

2) storing a series of correction values C(n) for n=0 to n=D such that $$C(n)=R\{(2n-1)*Q\},$$

wherein Q=(N2−N1)/2D;

3) comparing (N−N1) to the stored values of C(n) in order to obtain an integer m such that $$C(m)\leq(N-N1)<C(m+1);\ \text{and}$$

4) assigning the error value E(N) to be equal to m obtained in step 3.

13. The device of claim 8 further comprising an A/D converter (20) for receiving analog signals, converting the analog signals to said first digital signal, and providing said first digital signal to said storing means.

14. The device of claim 13 further comprising a multiplexer (10), wherein said A/D converter (20) receives analog signals via said multiplexer.

* * * * *